United States Patent
Tidestav et al.

(10) Patent No.: US 10,728,808 B2
(45) Date of Patent: Jul. 28, 2020

(54) METHODS AND ARRANGEMENTS FOR MEASUREMENT BASED MOBILITY

(71) Applicant: Telefonaktiebolaget LM Ericsson (publ), Stockholm (SE)

(72) Inventors: Claes Tidestav, Bålsta (SE); Icaro L. J. Da Silva, Solna (SE); Qingyu Miao, Beijing (CN); Johan Rune, Lidingö (SE); Zhang Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/335,048

(22) PCT Filed: Sep. 30, 2016

(86) PCT No.: PCT/CN2016/101051
§ 371 (c)(1),
(2) Date: Mar. 20, 2019

(87) PCT Pub. No.: WO2018/058514
PCT Pub. Date: Apr. 5, 2018

(65) Prior Publication Data
US 2019/0281509 A1   Sep. 12, 2019

(51) Int. Cl.
*H04W 36/00* (2009.01)
*H04W 36/36* (2009.01)

(52) U.S. Cl.
CPC ... *H04W 36/0058* (2018.08); *H04W 36/0083* (2013.01); *H04W 36/36* (2013.01)

(58) Field of Classification Search
CPC .............. H04W 36/0083; H04W 36/36; H04W 36/0058; H04W 36/0072; H04W 36/14;
(Continued)

(56) References Cited

U.S. PATENT DOCUMENTS 9,439,206 B2   9/2016  Hofmann et al.
10,327,183 B2 * 6/2019  Reial ................ H04W 36/30
(Continued)

FOREIGN PATENT DOCUMENTS

CN        1878374 A      12/2006
CN      101617545 A      12/2009
(Continued)

OTHER PUBLICATIONS

Ericsson, "W1 design for implicit advanced CSI reporting", 3GPP TSG-RAN WG1#86, Gothenburg, Sweden, Aug. 22, 2016, pp. 1-6, R1-167645, 3GPP.
(Continued)

*Primary Examiner* — Magdi Elhag
(74) *Attorney, Agent, or Firm* — Coats & Bennett, PLLC

(57) ABSTRACT

The present disclosure relates to methods and arrangements for performing wireless device assisted handover form a source access node to a target access node. Performed in a wireless device, the method comprises performing (S31) one or more mobility measurements for corresponding candidate radio links and transmitting (S33) a first radio link measurement report, comprising the mobility measurements for a recommended target link, using a first radio link reporting mechanism to the source access node. When communication over a target link is not initiated under a predetermined condition, the method comprises transmitting a second radio link measurement report, for the one or more candidate radio links, on the recommended target link using a second radio link reporting mechanism different from the first radio link reporting mechanism.

20 Claims, 5 Drawing Sheets

(58) Field of Classification Search
CPC ....... H04W 36/00837; H04W 36/0085; H04W 36/0088; H04W 16/28; H04W 36/00; H04W 36/0094; H04W 36/0016; H04W 74/0833
See application file for complete search history.

(56) References Cited

U.S. PATENT DOCUMENTS

| | | | |
|---|---|---|---|
| 2008/0020770 | A1 | 1/2008 | Hofmann |
| 2009/0168718 | A1 | 7/2009 | Wang et al. |
| 2009/0268707 | A1 | 10/2009 | Pani et al. |
| 2010/0279679 | A1 | 11/2010 | Young et al. |
| 2013/0201913 | A1* | 8/2013 | Niemela ............. H04L 25/0226 370/328 |
| 2014/0080484 | A1 | 3/2014 | Centonza et al. |
| 2015/0031379 | A1* | 1/2015 | Zhi ....................... H04W 24/10 455/450 |
| 2015/0382258 | A1* | 12/2015 | Schmidt ................ H04W 48/16 455/440 |
| 2016/0029333 | A1* | 1/2016 | Seo .................... H04L 27/2655 370/350 |
| 2016/0037425 | A1 | 2/2016 | Van Lieshout et al. |
| 2016/0150435 | A1 | 5/2016 | Baek et al. |
| 2016/0345216 | A1* | 11/2016 | Kishiyama ........ H04W 36/0083 |
| 2016/0381610 | A1* | 12/2016 | Pu .................... H04W 36/0055 455/436 |
| 2017/0215117 | A1* | 7/2017 | Kwon ....................... H04B 7/04 |
| 2019/0200320 | A1* | 6/2019 | Selvaganapathy .... H04W 64/00 |
| 2019/0215737 | A1* | 7/2019 | Reial ................ H04W 36/0033 |
| 2019/0230536 | A1* | 7/2019 | Da Silva ............. H04B 7/0695 |
| 2019/0261230 | A1* | 8/2019 | Reial ................ H04W 36/0058 |

FOREIGN PATENT DOCUMENTS

| | | |
|---|---|---|
| CN | 102223664 A | 10/2011 |
| CN | 102281577 A | 12/2011 |
| CN | 103220048 A | 7/2013 |
| CN | 103329593 A | 9/2013 |
| CN | 103428758 A | 12/2013 |
| CN | 104469873 A | 3/2015 |
| CN | 104488317 A | 4/2015 |
| CN | 105144614 A | 12/2015 |
| EP | 2568739 A2 | 3/2013 |
| EP | 2747474 A | 6/2014 |
| WO | 2010148536 A1 | 12/2010 |
| WO | 2014164144 A1 | 10/2014 |
| WO | 2015164712 A1 | 10/2015 |
| WO | 2016014203 A1 | 1/2016 |
| WO | 2016053426 A1 | 4/2016 |
| WO | 2016129957 A1 | 8/2016 |
| WO | 2016198123 A1 | 12/2016 |
| WO | 2018053748 A1 | 3/2018 |
| WO | 2018058512 A1 | 4/2018 |
| WO | 2018058513 A1 | 4/2018 |
| WO | 2018058515 A1 | 4/2018 |

OTHER PUBLICATIONS

Intel Corporation, et al., "WF on beam management", Agenda item: 8.1.5, 3GPP TSG RAN1 #86, Gothenburg, Sweden, Aug. 22, 2016, pp. 1-2, R1-168119, 3GPP.

3rd Generation Partnership Project, "3rd Generation Partnership Project; Technical Specification Group Radio Access Network; Physical layer; Measurements (FDD) (Release 13)", Technical Specification, 3GPP TS 25.215 V13.0.0, Dec. 1, 2015, pp. 1-25, 3GPP.

Ericsson, "Mobility Measurements and Procedures", 3GPP TSG-RAN WG2 #94, Nanjing, P.R. China, May 23, 2016, pp. 1-5, R2-164001, 3GPP.

\* cited by examiner

METHODS AND ARRANGEMENTS FOR MEASUREMENT BASED MOBILITY

TECHNICAL FIELD

The present disclosure relates to methods and arrangements for performing wireless device assisted handover form a source access node to a target access node.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink. In order to support high data rates, LTE allows for a system bandwidth of 20 MHz, or up to 100 MHz when carrier aggregation is employed, and LTE will continue to evolve. In parallel to the LTE evolution, a new generation of cellular technology is being developed, a $5^{th}$ generation system, 5G. One of the tasks for 5G is to improve throughput and capacity compared to LTE. This is in part to be achieved by increasing the sampling rate and bandwidth per carrier. 5G is also including use of higher carrier frequencies i.e., above 6 GHz.

In an UTRAN and an E-UTRAN, a User Equipment, UE, or a wireless device is wirelessly connected to a Radio Base Station, RBS, commonly referred to as a NodeB, NB, in UMTS, and as an evolved NodeB, eNodeB or eNB, in LTE. A Radio Base Station, RBS, access node, AN, or access point, AP, is a general term for a radio network node capable of transmitting radio signals to a UE and receiving signals transmitted by a UE. In Wireless Local Area Network, WLAN, systems the wireless device is also denoted as a Station, STA.

Future communications networks are expected to use advanced antenna systems to a large extent. With such antennas, signals will be transmitted in narrow transmission beams to increase signal strength in some directions, and/or to reduce interference in other directions. The high frequencies and reliance of beamforming makes it challenging to maintain a reliable radio link. A narrow beam can quickly be lost—in particular when combined with poor diffraction properties. Hence, beamforming based high-frequency radio access technologies are more susceptible to sudden changes in link quality or even loss of coverage, which may lead to significant delays and signaling until the wireless device can recover and find coverage again.

In LTE, some downlink reference signals are broadcasted in an always-on manner and over the full bandwidth, regardless of the presence or position of UEs in the system. These signals are called cell specific reference signals, CRS. A user equipment, UE, receiving the reference signal can measure the quality of neighbor cells for mobility purposes. Applying such continuous transmission of reference signals in all individual transmission beams in such a future cellular communications network may consume resources available for data, and generate a lot of interference in neighboring cells. Continuous transmissions also cause high energy consumption in the radio access points.

One option for reporting the measurements, also known as mobility reference signal measurements, from the UE back to the NW is to use RRC signaling. The information is aggregated at the L3 level and long report lengths may be supported that allow conveying information about many detected candidate link identities and their estimated signal strengths or qualities. Upon the reception of these measurement reports the network is capable of taking handover decisions, either to keep the UE in the cell, move it to another cell within the same frequency, another frequency and/or RAT. The link switch decision may then be taken by the NW considering a combination of link quality and network status parameters.

However another option for handling radio link with non-RRC reporting is also being investigated based on physical layer, L1-based, reporting using suitable uplink signals, e.g., Uplink Synchronization Sequences, USS, a locally unique signal carrying a synchronization pilot and an identity. Alternatively, the L1-based reporting may use a physical random access channel (PRACH) preamble. The UE may be configured to send the USS to the target to indicate e.g. the best of a set of candidate DL beams through a preconfigured USS sequence. The UE is configured for performing mobility measurements of multiple candidate beams and, upon detecting the strongest beam; it should directly access the node it originates from. This is done by sending an USS whose uplink, UL, resources (Time/Frequency slot, sequence) are associated with the downlink, DL, beam; the association is preconfigured by the network. The receiving AN, e.g. the target AN, reserves UL resources for USS detection ahead of time, which allows the report to be conveyed with minimal latency. Upon receiving a USS report, an AN, e.g. the target AN, may signal in the DL the new serving link to allow sync parameter updates and other possible configuration changes at the UE. This L1-based method is a quicker way to access a target beam in scenarios where the SINR of the serving link can quickly drop due to shadowing and provides for an improvement in terms of robustness and latency, due to the fact that the UE sends the reporting directly to the target while in the RRC-based method the UE needs to send the measurements to the source, wait for a decision from the source and eventually receive an RRC Connection Re-configuration from the serving link which might be under bad radio conditions.

RRC-based measurement reporting allows conveying reliable, rich measurement information from the UE to the network, but often with considerable signaling overhead and potentially high latency. Only using RRC signaling for mobility decisions, as in LTE, may create problems in some scenarios envisioned for the New Radio, NR, in 5G, such as when the UE is using a high gain beamforming in higher frequencies. There, the link quality provided by a beam can drop very quickly due to the aggressive shadowing effect that does not exist in frequencies when LTE is deployed and the narrow coverage of the beam. RRC signaling may therefore be unsuitable in scenarios in beam-formed systems where link quality diminishes rapidly outside the best coverage areas. The alternative approach, based on USS-reporting, may create problems in other scenarios and may entail complexity and resource drawbacks. In USS-based reporting, the UE can convey only a single link report at a time. Consequently, the beam switch or mobility procedure effectively becomes UE-controlled, since the best link detection and reporting from the UE determines the target link. Accordingly, there is a need to improve measurement reporting in support of mobility procedures.

SUMMARY

An object of the present disclosure is to provide solutions which seek to mitigate, alleviate, or eliminate one or more of the above-identified deficiencies in the art and to provide solutions improving signaling efficiency and link continuity during wireless device assisted handover.

This object is obtained by a method, for use in a wireless device, for performing wireless device assisted handover from a source access node to a target access node in a wireless network. The method comprises performing one or more mobility measurements for corresponding candidate links and transmitting a first radio link measurement report, comprising the mobility measurements for a target link, using a first radio link reporting mechanism to the source access node. When communication over a target link is not initiated under a predetermined condition, the method comprises transmitting a second radio link measurement report for the one or more candidate radio links, on the target link using a second radio link reporting mechanism different from the first radio link reporting mechanism.

The disclosed method enables comprehensive mobility measurement reporting whilst offering a solution for link continuity even during rapid loss of a serving link. Thus, the solution provides for link continuity in wireless networks where link quality diminishes rapidly outside a best coverage area, e.g., in high frequency beam-forming system having narrow beam coverage. At the same time the ability to fully benefit from comprehensive mobility reports from the wireless device is un-compromised and maintained in all scenarios where a more normal diminishing of link quality is experienced. A significant benefit of the disclosed solution is that no additional signaling of mobility measurements is required.

According to an aspect of the disclosure, the first radio link reporting mechanism is a radio resource control, RRC, reporting mechanism.

According to another aspect of the disclosure, the second radio link reporting mechanism is a physical layer radio link reporting mechanism.

Accordingly, the proposed method combines the advantages of comprehensive measurement reporting through RRC signaling with the fast link establishment that a physical layer radio link reporting mechanism, e.g., an uplink synchronization signal, USS, based reporting mechanism offers.

The above object of the disclosure is also obtained by a computer readable storage medium, having stored thereon a computer program which, when executed in a wireless device, causes the wireless device to execute any of the above mentioned aspects.

Likewise, the object of the disclosure is obtained by a wireless device that is configured for performing wireless device assisted handover from a source access node to a target access node. The wireless device comprises radio circuitry arranged for transmission and reception of radio signals. The wireless device further comprises processing circuitry configured to, using the radio circuitry, cause the wireless device to perform one or more mobility measurements for corresponding one or more candidate radio links, to transmit a first radio link measurement report, comprising the mobility measurements for a target link, using a first radio link reporting mechanism to the source node, and to transmit a second radio link measurement report, for the one or more candidate radio links, on the target link using a second radio link reporting mechanism different from the first radio link reporting mechanism when communication over the target link is not initiated under a predetermined condition.

The wireless device and the computer program enable the corresponding advantages of those described above in relation to the method performed in a wireless device.

The object to provide solutions improving signaling efficiency and link continuity during wireless device assisted handover is also obtained by a method performed in an access node for performing wireless device assisted handover from a source access node to a target access node. The method comprises transmitting at least one signal for the purpose of mobility measurements for a corresponding candidate radio link and allocating an uplink access slot for each candidate radio link associated to the transmitted signal. The method further comprises receiving first or second radio link measurement reports comprising mobility measurements for a target link of the candidate radio links, wherein the first or second radio link measurement reports are received through corresponding first or second mutually different radio link reporting mechanisms and wherein the second radio link measurement report is received in the uplink access slot of the target link.

The above mentioned object of the disclosure is also obtained by a computer readable storage medium, having stored thereon a computer program which, when executed in an access node, causes the access node to execute any of the above mentioned method aspects.

Likewise, the object of the disclosure is obtained by an access node that is configured for performing wireless device assisted handover from a source access node to a target access node. The access node comprises radio circuitry arranged for transmission and reception of radio signals, communications circuitry arranged for transmission and reception of inter node communications signals and processing circuitry. The processing circuitry is configured to, using the radio circuitry, cause the access node to transmit at least one signal for the purpose of mobility measurements for a corresponding candidate radio link allocate an uplink access slot for each candidate radio link associated to the transmitted signal. The processing circuitry is further configured to receive first and second radio link measurement reports comprising mobility measurements for a target link of the candidate radio links, wherein the first and second radio link measurement report are received through corresponding first or second mutually different radio link reporting mechanism and wherein the second radio link measurement report is received in the uplink access slot of the target link.

The method performed in an access node, the computer program and the network node enable the corresponding advantages of those described above in relation to the method performed in a wireless device.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

BRIEF DESCRIPTION OF THE DRAWINGS

The foregoing will be more readily understood from the following detailed description of example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
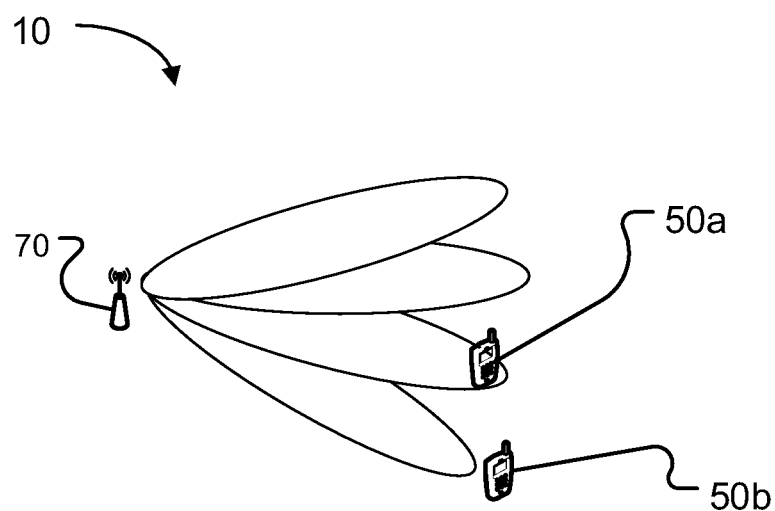
FIG. 1 illustrates a beam sweep transmitted from an access node.

Aspects of the present disclosure will be described more fully hereinafter with reference to the accompanying drawings. The methods and arrangements disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments.

In some embodiments the term "access node" is used and it can correspond to any type of access node or any network node, which communicates with a UE and/or with another network node. Examples of access nodes are NodeB, base station, multi-standard radio, radio node, eNodeB, network controller, radio network controller, base station controller, relay, donor node controlling relay, base transceiver station, access point, transmission points, transmission nodes, nodes in distributed antenna system, DAS etc.

Within the context of this disclosure, the terms "wireless device" or "wireless terminal" encompass any terminal which is able to communicate wirelessly with an access node of a wireless network, as well as, optionally, with another wireless device, by transmitting and/or receiving wireless signals. Thus, the term "wireless device" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless devices. Hence, whenever a "user equipment" or "UE" is referred to in this disclosure, this should be understood as encompassing any wireless device as defined above.

In support for higher frequencies in 5G communication systems, beamforming is an essential component. Using antenna arrays at access nodes with the number of elements in the hundreds, fairly regular grid-of-beams coverage patterns with tens or hundreds of candidate beams per node may be created. The coverage area of an individual beam from such an array may be small, down to the order of some tens of meters in width. Channel quality degradation outside the current serving beam area may be significant and occur quickly due to the limited coverage area of the beam.

As a consequence, mobility procedures in 5G also need to address the problem of finding candidate beams and not only a target AN. Beam sweep procedures are typically employed whereby a beam, i.e., a reference signal used for synchronization and mobility, is sequentially transmitted in a plurality of beam directions from an AN. FIG. 1 illustrates a beam sweep transmitted from an AN having one transmission point. Such a beam sweeping procedure with the purpose of synchronization and beam finding may be performed in conjunction with handover of a wireless device from one beam to another. A handover preparation procedure involving beam sweeping may involve candidate target beams from the wireless device's current serving access node and/or one or more other candidate target access nodes. In 5G systems it is also expected that one single access node might have several transmission points.

Different measurement reporting mechanisms are being investigated for the beam quality reporting: RRC based reporting and a PHY-layer based reporting using Uplink Synchronization Sequences, USS, or physical random access channel, PRACH, preamble, where a UE is configured to send the USS to the target node to indicate e.g. the best of a set of candidate DL beams through a preconfigured USS sequence, or PRACH preamble sequence.

In RRC-based reporting, the UE is configured to measure so-called mobility reference signals and, upon the triggering of certain pre-configured events, e.g., serving beam lower than a first threshold while neighbor beam is higher than a second threshold, the UE sends an RRC measurement report message comprising comprehensive, reliable measurement information to a serving source AN, or AN-s, via an established RRC Connection. Based on that, the AN, or more specifically the network function managing mobility, can take educated mobility decisions since the report message will contain radio measurements with respect to multiple candidate nodes or beams associated to a certain UE at certain point in time.

Figure 2:
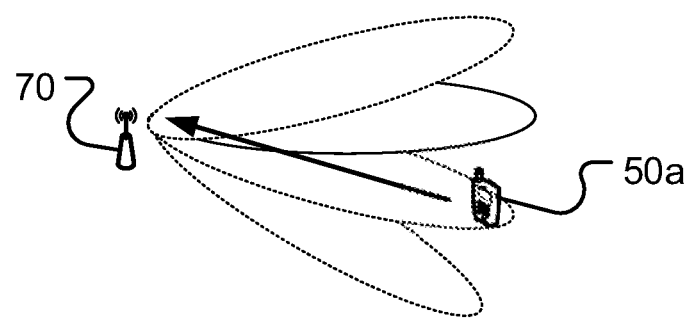
FIG. 2 illustrates a measurement report transmission from the wireless device.

In USS-based reporting the UE is configured to measure mobility reference signals of multiple candidate beams and, to send as a measurement report, an USS whose uplink, UL, resources, e.g., T/F slot and sequence, are associated with the downlink, DL, beam. FIG. 2 illustrates a wireless device reporting one beam of the beam sweep of FIG. 1. This method presents a quicker way to access a target beam in scenarios where the SINR of the serving link can quickly drop due to shadowing, to counteract the propagation challenges in a beam-based system. In terms of robustness and latency, there is an improvement compared to the RRC-based method due to the fact that the UE sends the reporting directly to the target access node, while in the RRC-based method the UE needs to send the measurements to the source access node, wait for a decision from the source and eventually receive a mobility command, e.g., an RRC Connection Re-configuration message, on the serving link which might be under bad radio conditions.

RRC-based measurement reporting allows conveying reliable, rich measurement information from the UE to the network, but often with considerable signaling overhead and potentially high latency. In USS-based reporting, the UE can convey only a single link report at a time. Consequently, the beam switch or mobility procedure effectively becomes UE-controlled and may be less reliable than the RRC-based procedure. Thus, using RRC signaling for mobility decisions entails problems in some 5G scenarios, but the alternative approach may also be problematic in other 5G scenarios.

This methods and arrangements presented in this disclosure take advantage of the benefits offered by RRC-based reporting and USS-based reporting whilst reducing the associated draw-backs. The idea is to configure a UE to trigger a specific reporting mechanism or combination of reporting mechanisms for mobility related reporting.

As is clear from the above sections, the disclosed solutions are particularly beneficial in wireless networks employing high-gain beamforming, where the candidate links are the different beam configurations that would be used for communication with the wireless device, as illustrated in FIG. 1. However, the principles are also equally applicable to more traditional, cell- and sector-based deployments. Furthermore, in the disclosure, the terms 'links' and 'beams' are used interchangeably and when referring to a beam this represents one example of a link.

Figure 3:
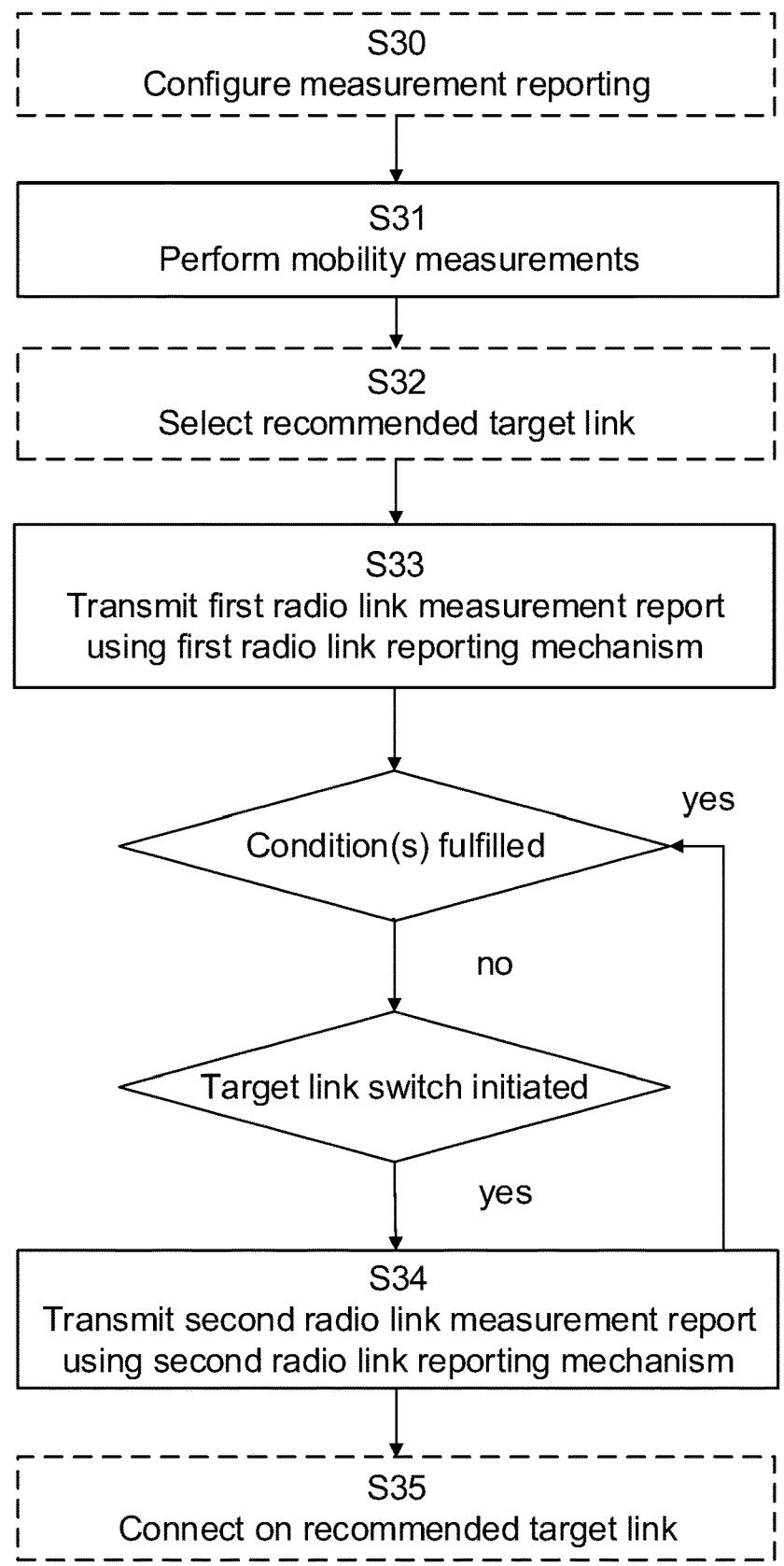
FIG. 3 is a flowchart illustrating exemplary method steps performed in wireless device.

FIG. 3 illustrates, in a flowchart, exemplary method steps performed in a wireless device for performing wireless device assisted handover from a source access node to a target access node. The method comprises to perform S31, in the wireless device, one or more mobility measurements for corresponding one or more candidate radio links. According to an aspect of the disclosure, the performing of one or more mobility measurements comprises measuring downlink mobility reference signals, MRS, for corresponding candidate radio links. The wireless device is configured for such MRS measurements and reporting, either ahead of time or immediately before the measurements, e.g., through receiving S30 a configuration from a serving access node. The serving access node will in the following be denominated as a source access node, i.e., the access node to which the wireless device is connected when a mobility procedure is initiated. In general, the wireless device measures the mobility reference signals of multiple candidate links, i.e., mobility measurements for corresponding candidate links. According to an aspect of the disclosure, the wireless device derives downlink, DL, synchronization settings from the downlink mobility reference signals and stores these DL synchronization settings for the candidate radio links, i.e., with respect to all detected candidate links. The mobility reference signals may consist of synchronization sequences to obtain time and frequency (T/F) alignment with respect to candidate link signals and link identification sequences to distinguish the different detected candidate link identities. The mobility reference signals may be used to trigger measurement reports. Usually, the triggering conditions are set so that the wireless device sends a report when a candidate link is deemed better than the currently serving link.

According to an aspect of the disclosure, the mobility measurements, e.g., measurements of the mobility reference signals, are used to trigger measurement reports from the wireless device to the network. Usually, the triggering conditions are set so that the wireless device sends a report when a candidate link is deemed better than the currently serving link and a switch or handover to the candidate link should be considered. Thus, in essence, the wireless device recommends handover to a target link based on the mobility measurements, i.e., selects S32 a recommended target link based on the mobility measurements. The wireless device transmits S33 a first radio link measurement report, comprising at least the mobility measurements for the recommended target link, using a first radio link reporting mechanism to the source access node. The performing of mobility measurement comprises measuring downlink mobility reference signals for corresponding candidate radio links, thus providing a comprehensive set of measurements that may be sent in the first radio link measurement report. The measurement report includes a recommended handover target link; implicit in that it has the best reported channel quality estimate. According to an aspect of the disclosure, the first radio link reporting mechanism is a radio resource control, RRC, reporting mechanism. Thus, the wireless device sends an RRC measurement report to the network, i.e., the source access node, providing identity and quality information for one or moreof candidate links.

The RRC measurement report is potentially based on a request from the network/access node or, as mentioned, on a triggering condition activating the performing of the mobility measurements. Thus, there may be network configured criteria for when the wireless device should send the RRC measurement report. For instance, in case the difference between best and second best measured MRS is below a certain threshold, the wireless device should send the RRC measurement report. Alternatively, if the second best measured candidate link is above an absolute threshold, the wireless device should send the RRC measurement report.

When communication over a target link is not initiated under a predetermined condition, the wireless device transmits S34 a second radio link measurement report, for the one or more candidate links, on the recommended target link, using a second radio link reporting mechanism different from the first radio link reporting mechanism. The second radio link measurement report reuses the mobility measurements performed for the one or more candidate radio links. The wireless device transmits S34 the second radio link measurement report identifying the recommended target link to a receiving target access node using a second radio link reporting mechanism. The target access node providing the recommended target link is one recipient of the second radio link measurement report, but according to aspects of the disclosure the report may also be transmitted to further target access nodes in the wireless communication system and also to the serving access node, also known as source access node. According to an aspect of the disclosure, the second radio link reporting mechanism is a physical layer radio link reporting mechanism and the reporting of the initial target link comprises reporting the best-quality link as recommended target link using a fast L1 reporting approach, e.g. by transmitting a USS or a PRACH preamble whose parameters (sequence, T/F resources) map to the best-quality link identity according to a previous configuration. Thus, according to an aspect of the disclosure, an uplink synchronization sequence, USS, provides the physical layer radio reporting mechanism. For the USS based reporting, the wireless device may use a DL timing reference obtained from the best-quality link mobility reference signal, i.e., the recommended target link. The wireless device initiates communication over the recommended target link, e.g., by transmitting a USS according to the recommended target link's DL timing and receives control signaling, e.g., a TA command in the DL control channel. The link to the recommended target is thus established.

As mentioned above, transmission of the second radio link measurement report occurs when communication over a target link is not initiated under a predetermined condition. According to an aspect of the disclosure, the predetermined condition is that communication is initiated over a target link within a predetermined time period. The value of this predetermined time period can be predefined or pre-configured with signaling, e.g., when configuring S30 the measurement reporting. The predetermined time period may be used as a timer value for a timer set in the wireless device following transmission of the first radio link measurement report. According to an aspect of the disclosure, the wireless device starts the timer when it detects the event that triggers the first radio link measurement report, i.e., prior to sending the first radio link measurement report. When the timer expires, the UE sends a second radio link measurement to the target node providing the recommended target link. According to an aspect of the disclosure, the wireless device uses the stored link synchronization to transmit the USS at the right time.

After sending the USS, the UE waits for a scheduling grant from the target access node. After having received that scheduling grant, control of the wireless device is handed over to the target access node, which now assumes responsibility for the wireless device.

According to a further aspect of the disclosure, the wireless device may receive instructions over the source link to access another candidate access node, e.g. a handover command and/or reconfiguration message, or to stay with the serving access node while the timer is running. If any such modification message is received, the wireless device stops the timer and acts in accordance with the new instructions.

According to an aspect of the disclosure, other conditions that may cause transmission of the second radio link measurement report comprise that the serving link is no longer viable for transmission of a measurement report or reception of a handover command and/or reconfiguration message, where this may be detected by the wireless device determining that reference signals, such as MRSs or CSI-RSs, or other pilot signals can no longer be heard/received (with sufficient quality) on the serving link.

According to another aspect of the disclosure, the wireless device is triggered to proceed to transmit the second radio link measurement report when it determines that no handover command and/or reconfiguration message (triggered by a MRS measurement report sent by the wireless device) has successfully been received on the serving link after a configured, maximum number of negative HARQ feedback indications and possibly higher layer protocol, e.g., RLC or PDCP, negative feedback indications, sent in response to failed reception of downlink transmission(s).

The wireless device initiates S35 communication over the recommended target link, e.g., by transmitting a USS according to the recommended target link's DL timing and receives control signaling, e.g., a TA command in the DL control channel. The USS is used to access the target node providing the recommended target link. Conceptually similar to MRS, the USS is a locally unique signal (i.e. within a certain neighborhood of access nodes), carrying a synchronization pilot and an identity. The local uniqueness should be maintained on a per time/frequency slot basis during a given reporting occasion.

Figure 4:
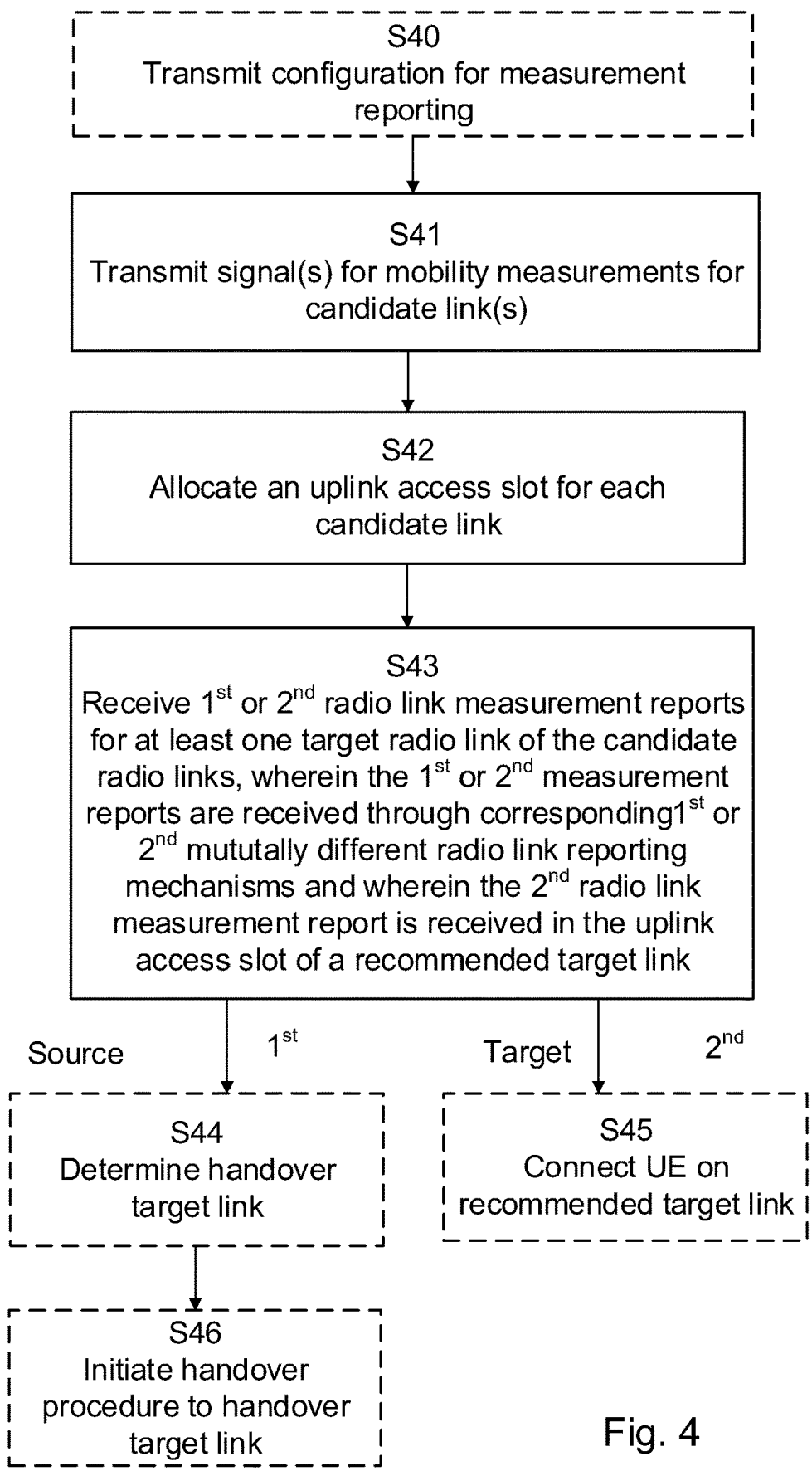
FIG. 4 is a flowchart illustrating network aspects of exemplary method steps performed in source or target access node.

FIG. 4 illustrates, in a flowchart, network aspects of the above discussed method. The disclosed operations are performed in network nodes providing a radio interface to a wireless device, i.e., one or more access nodes representing a source access node and a target access node for a wireless device assisted handover. Operations specific to the source and target access node have been identified as such.

The method performed in an access node comprises transmitting S41 at least one signal for the purpose of mobility measurements for a corresponding candidate radio link. Turning back to the beam sweep presentation given for FIG. 1, it will be understood that there are usually a number of candidate links provided by each target node. Hence, commonly a plurality of signals would be transmitted to enable mobility measurements for a plurality of candidate links. According to an aspect of the disclosure, the access node transmits S40 a configuration to the wireless device for configuring the wireless device performance of the mobility measurements. The configuration instructions configures the wireless device for performing one or more mobility measurements for corresponding one or more candidate radio links, e.g., to measure and report downlink, DL, mobility reference signal quality in multiple candidate links.

In a network comprising at least a source access node and a target access node, the network, i.e., the access node of the network, transmits multiple mobility reference signals corresponding to each candidate link. The mobility reference signals may be scheduled specifically for the given wireless device measurement session or scheduled as part of a periodic transmission pattern. An alternative to scheduling the candidate MRS transmissions specifically for a given wireless device measurement session, is that the mobility reference signal transmissions are repetitive on a permanent or semi-permanent basis and that the wireless device is configured to measure on a certain set of repetitive mobility reference signal transmissions.

The mobility reference signals are associated with uplink synchronization signals, USS, or physical random access channel, PRACH, preambles, according to predefined rules or through signaling from the network, so that the access nodes transmitting candidate mobility reference signals also have knowledge of the relation between each MRS and an USS or PRACH. Uplink access slots for each candidate link are allocated S42 by the network, in the access node that transmits a mobility reference signal. All access nodes transmitting signals for the purpose of mobility measurements, or a subset that is likely to successfully receive the USS, may be invoked in this process.

The network transmits multiple candidate mobility reference signals, scheduled specifically for the given wireless device measurement session or as part of a periodic transmission pattern, and awaits reports from the wireless device. The MRS allocation can either be specified in the standard, or determined by the network and signaled to the wireless device, e.g., with the mobility measurements configuration transmitted S40 to the wireless device.

The NW configures the wireless device to measure and report DL MRS quality for multiple candidate links and to send measurement reports to the source access node using the first radio link reporting mechanism, e.g., using RRC reporting, when specific conditions that motivate a handover are fulfilled. The report would indicate a recommended handover target (which could be implicit in that it has the best reported channel quality estimate), in addition to a potentially detailed measurement report for many MRSs. According to an aspect of the disclosure, the measurement reporting configuration to the wireless device includes a predetermined condition, e.g., a timer value associated with one or more report triggering event (where the timer is used as previously described). According to another aspect of the disclosure, the maximum number of HARQ retransmissions and/or the maximum number of higher protocol layer retransmissions to be used for the measurement report and/or the DL message it might trigger (e.g. a handover command and/or reconfiguration message) may be included in the same configuration message. In other embodiments, these maximum retransmission numbers may be standardized, signaled in SI or part of a general configuration of the serving link.

As mentioned above, uplink access slots are allocated S42 for each candidate. Every access node that transmits a mobility reference signal, or a subset that is likely to successfully receive the USS, must also be prepared to receive a USS. The allocation of that USS reception slot is determined by the network, and conveyed to the wireless device. For each such access node, at least some of the USS reception resources should be located in the time domain after a potential expiration of the above mentioned timer (or after the estimated time of a maximum number of HARQ and possible higher protocol layer retransmission attempts). If the mobility reference signals are repeatedly transmitted, allocated USS resources must also occur repetitively with the same period.

The network receives S43 first or second radio link measurement reports comprising mobility measurements for a recommended target link of the candidate radio links, wherein the first or second radio link measurement reports are received through corresponding first or second mutually different radio link reporting mechanisms and wherein the second radio link measurement report is received in the uplink access slot of the target link. The source access node attempts to receive a first radio link measurement report, e.g., an RRC report, via the current serving link. The target access nodes have been prepared for receiving a second radio link measurement report in the uplink access slots allocated for each candidate link. The RRC report provides a potentially comprehensive list of candidate link identities detected by the wireless device and their qualities. The RRC report also, explicitly or implicitly, contains a recommended target link. When successfully receiving an RRC report containing a recommended target link, the source access node determines S44 a handover target link. The source access node may then take into account not only the measurement report, but also other quantities, such as load in access nodes associated with different links. When the source access node has determined the handover target link, which may very well be the recommended target node, the source access node initiates S46 a handover procedure to the handover target link. The network or source access node may also determine if any reconfiguration is required of the wireless device. If any such reconfiguration is required, or if the network has determined handover of the wireless device to another link than the recommended target link, initiating S46 a handover procedure to the handover target node also comprises to send a handover command to the wireless device, similar to the procedure in prior art.

If the network decides to perform a handover to the recommended target link and that no reconfiguration is required, the handover procedure may be initiated by a "go" command over RRC (or possibly a lower layer protocol) to the wireless device. According to another aspect of the disclosure, the network or source access node does not transmit anything. When the wireless device determines that communication over a target link is not initiated under the predetermined condition, e.g., that communication is initiated over a target link within a predetermined time period, the wireless device will transmit a second radio link measurement report on the recommended target link using a second radio link reporting mechanism. Thus, the wireless device initiates connection to a target access node providing the recommended target link. According to a further aspect of the present disclosure, the access node may also determine, based on the first radio link measurement report that the wireless device connection should be maintained as it is, i.e., that the serving link and the handover target link are the same. The source access node may then transmit a handover command to stay on the serving link over RRC (or possibly a lower layer protocol) to the wireless device.

In case the wireless device successfully receives a handover command from the source access node, information could be sent to the candidate access nodes to stop monitor uplink synchronization signal transmissions from the wireless device. According to an aspect, a target access node providing the recommended target link may use information about the handover target link determined by the network, i.e., the source access node, and send a physical layer or other low layer redirection command. The redirection command may for example be included in a mobility reference signal. The redirection command may be used to instruct the wireless device to communicate with the handover target link selected by the network if this is a different target link than the recommended target link.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed in FIGS. 3, 4, 4a and 4b. The particular sequence of such executable instructions or associated data structures represents examples of corresponding acts for implementing the functions described in such steps or processes.

Figure 5:
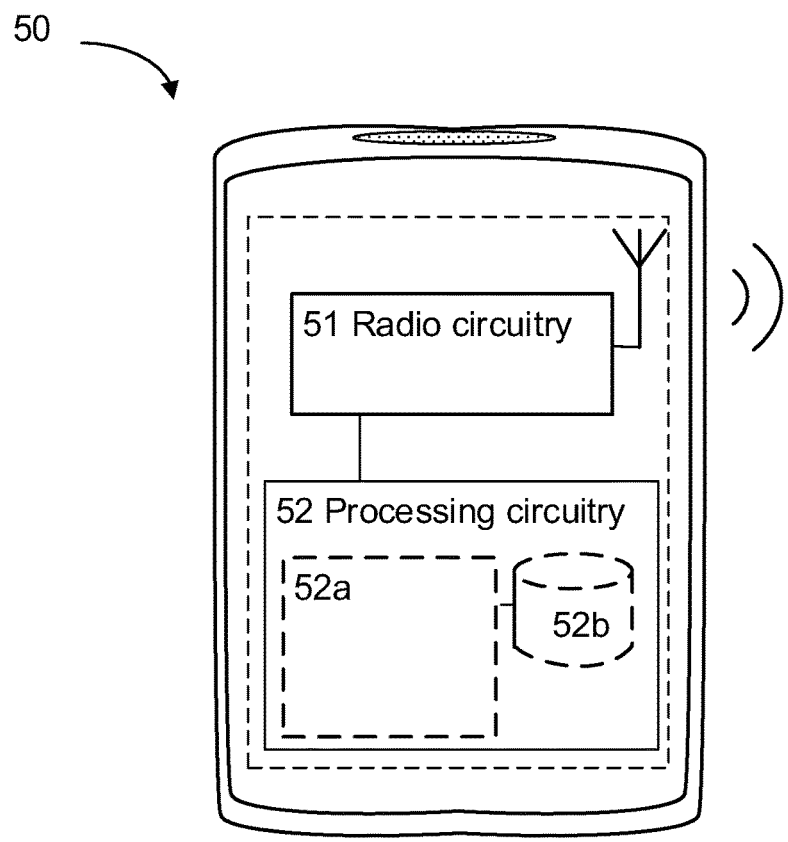
FIG. 5 illustrates an example wireless device configuration.

FIG. 5 is an example configuration of a wireless device, which may incorporate some of the example embodiments discussed above. The wireless device 50 is configured for performing wireless device assisted handover from a source node to a target node. As shown in FIG. 5, the wireless device comprises radio circuitry 51 arranged for transmission and reception of radio signals. It should be appreciated that the radio circuitry 51 may be comprised as any number of transceiving, receiving, and/or transmitting units or circuitry and that the radio circuitry may operate in half-duplex or full duplex transmission mode. It should further be appreciated that the radio circuitry 51 may be in the form of any input/output communications port known in the art.

The wireless device further comprises processing circuitry arranged to control operation of the wireless device. In particular, the processing circuitry 52 is configured to cause the wireless device to perform one or more mobility measurements for corresponding one or more candidate radio links, and to transmit a first radio link measurement report, comprising mobility measurements for a recommended target link, using a first radio link reporting mechanism. The processing circuitry is further configured to cause the wireless device to transmit a second radio link measurement report, for the one or more candidate radio links, on the recommended target link using a second radio link reporting mechanism different from the first radio link reporting mechanism when communication over a target link is not initiated under a predetermined condition.

According to an aspect of the disclosure, the processing circuitry comprises a processor 52a and a memory 52b. The processor 53a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry.

The memory 53b may further be configured to store received or transmitted data and/or executable program instructions. The memory 53b may be any suitable type of computer readable memory and may be of volatile and/or non-volatile type.

Figure 6:
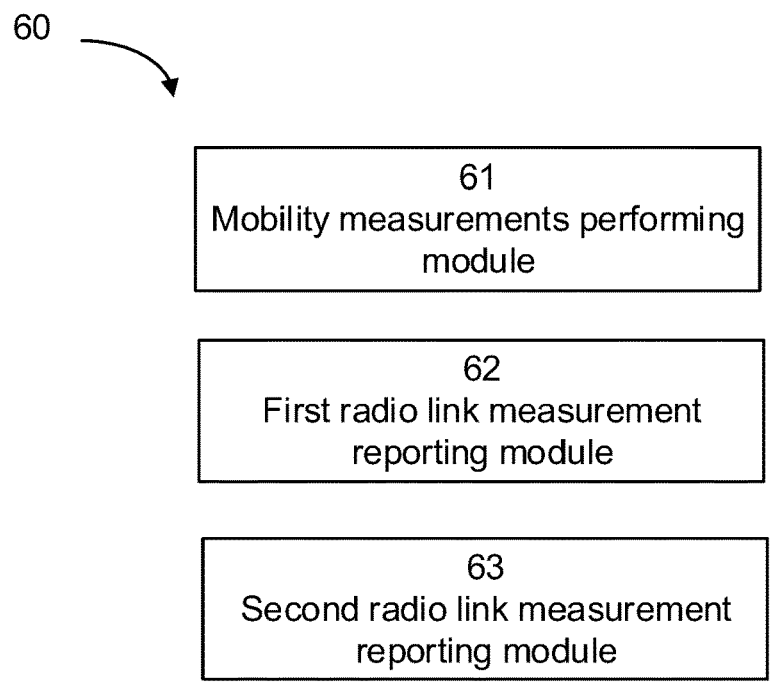
FIG. 6 illustrates an example wireless device configuration.

FIG. 6 illustrates an embodiment of a wireless device 60 configured for performing wireless device assisted handover from a source node to a target node. The wireless device 60 comprises a mobility measurements performing module 61 for performing mobility measurements for corresponding one or more candidate radio links, a first radio link measurement reporting module 62 configured to transmit a first radio link measurement report comprising the mobility measurements for a recommended target link, using a first radio link reporting mechanism to the source access node, and a second radio link measurement reporting module 63 configured to transmit a second radio link measurement report for the one or more candidate radio links on the recommended target link using a second radio link reporting mechanism different from the first radio link reporting mechanism when communication is not initiated under a predetermined condition.

Figure 7:
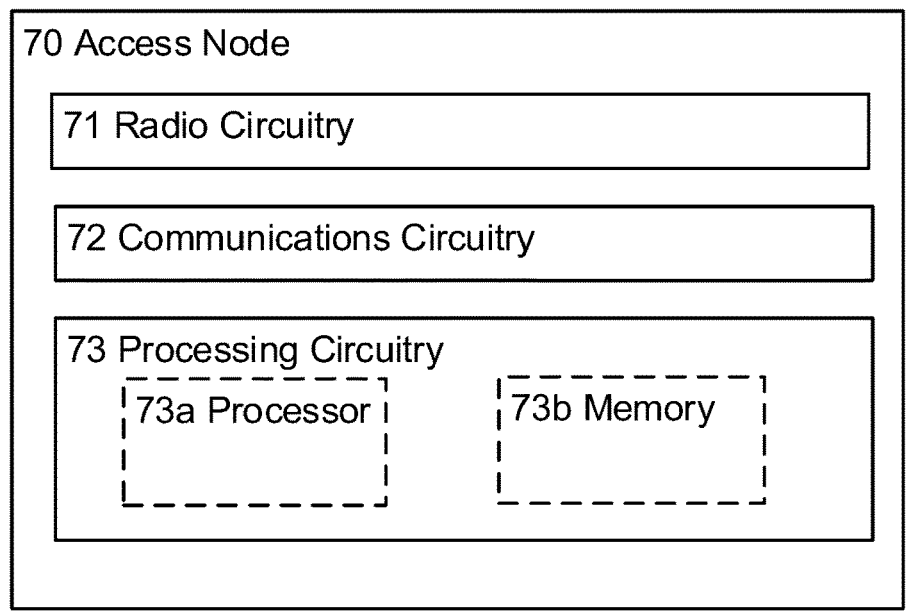
FIG. 7 illustrates an example node configuration for an access node.

FIG. 7 is an example configuration of an access node 70, which may incorporate some of the example embodiments discussed above. The access node 70 is configured for performing wireless device assisted handover from a source node to a target node. As shown in FIG. 7, the access node comprises radio circuitry 71 arranged for transmission and reception of radio signals. It should be appreciated that the radio circuitry 71 may be comprised as any number of transceiving, receiving, and/or transmitting units or circuitry and that the radio circuitry may operate in half-duplex or full duplex transmission mode. It should further be appreciated that the radio circuitry 71 may be in the form of any input/output communications port known in the art.

The access node may further comprise communications circuitry 72 arranged to transmit and/or receive communications signals from one or more further radio network nodes. It should further be appreciated that the communications circuitry 72 may be in the form of any input/output communications port known in the art.

The access node further comprises processing circuitry arranged to control operation of the access node. In particular, the processing circuitry 73 is configured to cause the access node to transmit at least one signal for the purpose of mobility measurements for a corresponding candidate radio link, to allocate an uplink access slot for each candidate radio link associated to the transmitted signal; and to receive first or second radio link measurement reports comprising mobility measurements for a target link of the candidate radio links, wherein the first or second radio link measurement reports are received through corresponding first or second mutually different radio link reporting mechanisms and wherein the second radio link measurement report is received in the uplink access slot of the target link.

According to an aspect of the disclosure, the processing circuitry comprises a processor 73a and a memory 73b. The processor 73a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry.

The memory 73b may further be configured to store received or transmitted data and/or executable program instructions. The memory 73b may be any suitable type of computer readable memory and may be of volatile and/or non-volatile type.

Figure 8:
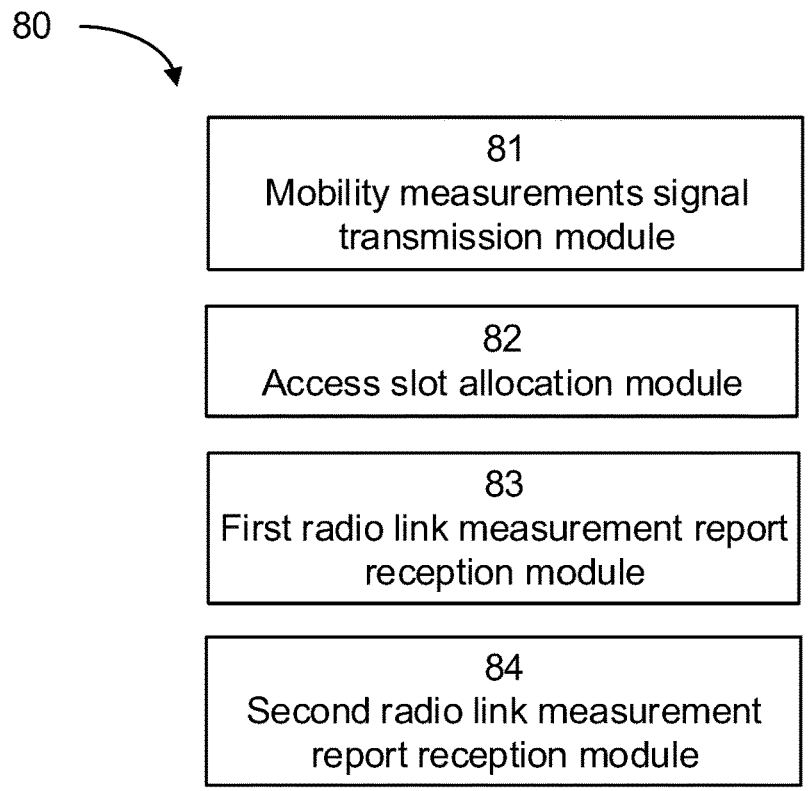
FIG. 8 illustrates an example node configuration for an access node.

FIG. 8 illustrates an embodiment of an access node 80 configured for performing wireless device assisted handover from a source node to a target node. The access node 80 comprises a mobility measurements signal transmission module 81 configured to transmit at least one signal for the purpose of mobility measurements for a corresponding candidate radio link, an access slot allocation module 82 configured to allocate an uplink access slot for each candidate radio link associated to the transmitted signal, first radio link measurement reception module 83 configured to receive a first radio link measurement report comprising mobility measurements for a target link through a first radio link reporting mechanism, and second radio link measurement report module configured to receive a second radio link measurement report comprising mobility measurements for a target link through a second radio link reporting mechanism different from the first radio link reporting mechanism.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of source nodes, target nodes, corresponding methods, and computer program products. It should be appreciated that the example embodiments presented herein may be practiced in combination with each other.

The invention claimed is:

1. A method, for use in a wireless device of a wireless network, for performing wireless device assisted handover from a source access node to a target access node, the method comprising the wireless device:
    performing one or more mobility measurements for corresponding one or more candidate radio links;
    transmitting a first radio link measurement report, comprising the mobility measurements for a recommended target link, using a Radio Resource Control (RRC) based reporting mechanism to the source access node; and
    when communication over a target link is not initiated under a predetermined condition, transmitting a second radio link measurement report, for the one or more candidate radio links, on the recommended target link using a Uplink Synchronization Sequence (USS) based reporting mechanism different from the first radio link reporting mechanism.

2. The method of claim 1, wherein the performing one or more mobility measurements comprises measuring downlink mobility reference signals for corresponding candidate radio links.

3. The method of claim 2, wherein the performing one or more mobility measurements further comprises:
    deriving downlink synchronization settings from downlink mobility reference signals; and
    storing the derived synchronization settings for the candidate radio links.

4. The method of claim 1, wherein the predetermined conditions is that communication is initiated over a target link within a predetermined time period from the transmission of the first radio link measurement report.

5. The method of claim 1, further comprising the wireless device selecting a recommended target link.

6. The method of claim 1, further comprising the wireless device initiating wireless device connection over the recommended target link.

7. A wireless device configured for performing wireless device assisted handover from a source access node to a target access node, the wireless device comprising:
    radio circuitry arranged for transmission and reception of radio signals;
    processing circuitry configured to, using the radio circuitry, cause the wireless device to:
        perform one or more mobility measurements for corresponding one or more candidate radio links;
        transmit a first radio link measurement report, comprising the mobility measurements for a recommended target link, using a Radio Resource Control (RRC) based reporting mechanism to the source access node; and
        when communication over a target link is not initiated is not initiated under a predetermined condition, transmit a second radio link measurement report, for the one or more candidate radio links, on the recommended target link using a Uplink Synchronization Sequence (USS) based reporting mechanism different from the first radio link reporting mechanism.

8. The wireless device of claim 7, wherein the processing circuitry is further configured to perform the one or more mobility measurements on downlink mobility reference signals for corresponding candidate radio links.

9. The wireless device of claim 8, wherein the processing circuitry is further configured to:
    derive downlink synchronization settings from downlink mobility reference signals; and
    store the derived synchronization settings for the candidate radio links.

10. The wireless device of claim 7, wherein the predetermined condition is that communication is initiated over a target link within a predetermined time period from the transmission of the first radio link measurement report.

11. The wireless device of claim 7, wherein the processing circuitry is further configured to select a recommended target link.

12. The wireless device of claim 7, wherein the processing circuitry is further configured to initiate wireless device connection over the recommended target link.

13. A method, for use in an access node, for performing wireless device assisted handover from a source access node to a target access node, the method comprising the access node:
    transmitting at least one signal for the purpose of mobility measurements for a corresponding candidate radio link;
    allocating an uplink access slot for each candidate radio link associated to the transmitted signal;
    receiving first or second radio link measurement reports comprising mobility measurements for a recommended target link of the candidate radio links, wherein the first or second radio link measurement reports are received through Radio Resource Control (RRC) based and Uplink Synchronization Sequence (USS) based reporting mechanisms respectively, and wherein the second radio link measurement report is received in the uplink access slot of the target link.

14. The method of claim 13, wherein the transmitting of at least one signal comprises transmitting downlink mobility reference signals for corresponding candidate radio links.

15. The method of claim 13, further comprising the access node determining a handover target link based on the first radio link measurement report.

16. The method of claim 13, further comprising the access node initiating a handover procedure for handover to the handover target link.

17. An access node configured for performing wireless device assisted handover from a source access node to a target access node, the access node comprising:
    radio circuitry for transmission and reception of radio signals;
    communications circuitry for transmission and reception of inter node communications signals;
    processing circuitry configured to, using the radio circuitry, cause the access node to:
        transmit at least one signal for the purpose of mobility measurements for a corresponding candidate radio link;
        allocate an uplink access slot for each candidate radio link associated to the transmitted signal;
        receive first or second radio link measurement reports comprising mobility measurements for a target link of the candidate radio links, wherein the first or second radio link measurement reports are received through Radio Resource Control (RRC) based and Uplink Synchronization Sequence (USS) based reporting mechanisms respectively, and wherein the second radio link measurement report is received in the uplink access slot of the target link.

18. The access node of claim 17, wherein the at least one signal comprises downlink mobility reference signals for corresponding candidate radio links.

19. The access node of claim 17, wherein the processing circuitry is further configured to determine a handover target link based on the first radio link measurement report.

20. The access node of claim 17, wherein the processing circuitry is further configured to initiate a handover procedure for handover to the handover target link.

* * * * *